United States Patent
Shiao et al.

(10) Patent No.: US 9,580,357 B2
(45) Date of Patent: Feb. 28, 2017

(54) ROOFING GRANULES, ROOFING PRODUCTS INCLUDING SUCH GRANULES, AND PROCESS FOR PREPARING SAME

(75) Inventors: Ming Liang Shiao, Collegeville, PA (US); Van Nhan Nguyen, Bourg-la-Rein (FR); Emmanuel Garre, Saint-Prix (FR); Sean Zhou, Collegeville, PA (US)

(73) Assignee: CertainTeed Corporation, Malvern, PA (US)

( * ) Notice: Subject to any disclaimer, the term of this patent is extended or adjusted under 35 U.S.C. 154(b) by 796 days.

(21) Appl. No.: 12/864,464

(22) PCT Filed: Aug. 20, 2009

(86) PCT No.: PCT/US2009/054467
§ 371 (c)(1),
(2), (4) Date: Aug. 11, 2010

(87) PCT Pub. No.: WO2011/022011
PCT Pub. Date: Feb. 24, 2011

(65) Prior Publication Data
US 2012/0157583 A1  Jun. 21, 2012

(51) Int. Cl.
*C23C 18/02* (2006.01)
*C04B 28/24* (2006.01)
*C23C 18/12* (2006.01)
*C04B 111/00* (2006.01)
*E04D 1/00* (2006.01)

(52) U.S. Cl.
CPC ............. *C04B 28/24* (2013.01); *C23C 18/122* (2013.01); *C23C 18/1225* (2013.01); *C23C 18/1254* (2013.01); *C04B 2111/00586* (2013.01); *C04B 2111/00827* (2013.01); *E04D 2001/005* (2013.01); *Y02B 80/34* (2013.01); *Y10T 428/2991* (2015.01)

(58) Field of Classification Search
CPC .............. C23C 18/122; C23C 18/1254; C23C 18/1225; C04B 2103/54; C04B 2103/67; C04B 2103/69; C04B 24/00; C04B 24/2623; C04B 14/06
See application file for complete search history.

(56) References Cited

U.S. PATENT DOCUMENTS

| | | | |
|---|---|---|---|
| 2,981,636 A | 4/1961 | Vanpoulle et al. | |
| 4,053,325 A | 10/1977 | Vanderheiden | |
| 4,594,363 A | 6/1986 | Blankenship et al. | |
| 4,753,679 A | 6/1988 | Damiano et al. | |
| 4,952,617 A | 8/1990 | Ayala et al. | |
| 5,036,109 A | 7/1991 | Chip et al. | |
| 5,053,441 A | 10/1991 | Biale | |
| 5,059,250 A | 10/1991 | Burow et al. | |
| 5,135,568 A | 8/1992 | Fasano | |
| 5,147,940 A | 9/1992 | Biale | |
| 5,273,824 A | 12/1993 | Hoshino et al. | |
| 5,401,313 A | 3/1995 | Supplee et al. | |
| 5,521,253 A | 5/1996 | Lee et al. | |
| 5,723,516 A | 3/1998 | Bigham et al. | |
| 6,043,319 A | 3/2000 | Lee et al. | |
| 6,174,360 B1 | 1/2001 | Sliwinski et al. | |
| 6,268,410 B1 | 7/2001 | Drechsler et al. | |
| 6,521,038 B2 | 2/2003 | Yanagimoto et al. | |
| 6,720,007 B2 | 4/2004 | Walt et al. | |
| 6,786,965 B2 | 9/2004 | Perry et al. | |
| 6,852,817 B2 | 2/2005 | Yukawa et al. | |
| 7,235,300 B2 | 6/2007 | Phillips et al. | |
| 7,241,500 B2 | 7/2007 | Shiao et al. | |
| 7,387,670 B2 | 6/2008 | Weber et al. | |
| 2004/0258835 A1 | 12/2004 | Hong et al. | |
| 2005/0072114 A1* | 4/2005 | Shiao et al. ................. 52/782.1 |
| 2006/0251807 A1* | 11/2006 | Hong et al. ................... 427/212 |
| 2006/0272228 A1* | 12/2006 | Stock et al. ................. 52/173.1 |
| 2008/0008832 A1 | 1/2008 | Shiao et al. | |
| 2008/0008857 A1 | 1/2008 | Kalkanoglu et al. | |
| 2008/0026183 A1* | 1/2008 | Vanpoulle et al. ........... 428/143 |
| 2008/0241472 A1 | 10/2008 | Shiao et al. | |
| 2008/0261007 A1 | 10/2008 | Hong et al. | |

* cited by examiner

*Primary Examiner* — Karuna P Reddy
(74) *Attorney, Agent, or Firm* — Paul & Paul

(57) ABSTRACT

A coating composition including an inorganic sol material and an organic colorant is applied to mineral particles and cured at a temperature less than 200 degrees Celsius.

18 Claims, 3 Drawing Sheets

ROOFING GRANULES, ROOFING PRODUCTS INCLUDING SUCH GRANULES, AND PROCESS FOR PREPARING SAME

CROSS-REFERENCE TO RELATED APPLICATION

This is a national stage 371 application of International Application No. PCT/US2009/0054467, filed Aug. 20, 2009.

BACKGROUND OF THE INVENTION

1. Field of the Invention

The present invention refers to roofing granules and roofing products.

2. Brief Description of the Prior Art

Asphalt shingles are conventionally used in the United States and Canada as roofing and siding materials.

Asphalt shingles can be classified into two types of shingles according to the nature of the reinforcement. "Organic" shingles contain cellulose or wood fiber as a thick fiber felt. "Glass fiber" shingles contain a nonwoven mat of glass fibers held together by a binder that is insoluble in water.

In the manufacture of organic shingles, a continuous web of organic fiber felt is fed from a supply roll to an accumulating device made up of several rollers, and then immersed in a first liquid asphalt bath having a temperature of about 250° C. After leaving the first liquid asphalt bath, the felt passes through a second accumulating device so that the felt can absorb excess asphalt and cool slightly. The so-impregnated felt is then coated with molten asphalt on each of its two faces, which ultimately become respectively the upper and lower faces of the web. Roofing granules are distributed on the upper face, and an anti-adhesive agent, for example, talc, is applied to the lower face. The resulting web passes between the rollers of a cold calendar so as to partially embed the roofing granules in the hot asphalt layer on the upper face of the web, and the subsequently cooled product is collected in the form of rolls or of sheets cut to the desired dimensions.

Except for the first stage of impregnation, which is omitted, the manufacture of the glass fiber shingles is carried out in the same way.

In the shingle, the asphalt functions principally to make material impervious to water. It is also used to support the granules and to give strength to the material. The highly ductile character of the asphalt-impregnated felt makes it possible to obtain a flexible product. In general, the longevity of the shingle increases with the quantity of asphalt employed.

The roofing granules, in general formed from mineral materials, serve to provide the shingle with durability. They protect the asphalt from the effects of the solar radiation (in particular from the degradative effects of ultraviolet rays) and of the environment (wind, precipitation, pollution, and the like), and contribute to better reflection of incident radiation. The granules moreover are typically colored, naturally or artificially by way of the application of pigments, to meet the aesthetic requirements of the user.

Roofing granules are typically manufactured by using suitable mineral particles coated with coating compositions formed from mixtures of inorganic metal-silicate binders, extender, and metal oxide colorants. Examples of making such granules are disclosed in U.S. Pat. No. 2,981,636. However, such coating processes typically require curing at elevated temperatures, such as above 300 degrees Celsius, or the use of extensive acid wash to render the coating durable for roofing applications, and provide porous coatings. As a result, many colorants or functional additives, which are not resistant to high temperatures or to the corrosive acid-wash process, cannot be used. This limits the palette of colors which can be used in manufacturing roofing granules. Furthermore, the type of coating formed in the conventional process is known to be prone to the so-called "staining" problems as this type of coating tends to absorb oils from the asphalt substrate, apparently reflecting the porosity of the coating.

International Patent Publication WO 2006/106263 A2 discloses biocidal granules consisting of a mineral core coated with at least one porous inorganic coat containing at least one organic compound adapted to limit or to prevent micro-organism growth, in particular algae, as well as a method for sol-gel preparation of such biocidal granules and the use of said biocidal granules in building materials, in particular shingles and façade coatings.

U.S. Pat. No. 5,723,516 discloses inorganic particles coated with a composition including an organometallic polymeric binder and a temperature-sensitive colorant. The binder comprises the reaction product of water with at least one component of a binder precursor. The binder precursor composition can comprise an inert organic polymer and a hydrolyzable liquid organometallic solvent such as TEOS; a water reactive organic polymer dissolved in an inert organic solvent; or a water-reactive organic polymer dissolved in a hydrolyzable liquid organic solvent.

U.S. Pat. No. 6,786,965 discloses an organic pigment dispersion for coloring building material such as concrete including alkali metal silicate particles, organic pigment and a dispersant which is milled to produce a pigment particle size of from 100 to 300 nanometers.

Hence, it would be advantageous to have an inorganic coating system that can be cured in relatively low temperatures. It is further advantageous to have an inorganic coating that provides better staining resistance without the need of additional surface treatment.

SUMMARY OF THE INVENTION

In one aspect, the present invention provides a process for producing roofing granules comprising providing base particles and a coating composition comprising an inorganic sol material and at least one organic colorant. This process further comprises applying the coating composition to the base particles to form a coating layer on the base particles, and curing the coating layer at a temperature less than 200 degrees Celsius. Preferably, the inorganic sol is selected from sols of alkylsilanes, alkoxysilanes, siloxane oligomers; aluminum alkoxides, titanium alkoxides, zirconium alkoxides, aluminum chloride, zirconyl chloride, organozirconates, and organotitanates. Preferably, the process further comprises preparing the inorganic sol from a hydrolyzable sol-gel precursor material by acidifying the precursor material to initiate hydrolysis and condensation of the precursor material to form an intermediate material. Preferably, the sol-gel precursor material is an alkoxysilane selected from the group consisting of tetramethoxysilane, tetraethoxysilane, tetra-n-propoxysilane, tetra-n-butoxysilane, tetrakis(2-methoxyethoxy)silane, methyltriethoxysilane, methyltrimethoxysilane, methyl tri-n-propoxysilane, phenyl triethoxysilane, and vinyl triethoxysilane. Further, preferably the intermediate material is formed in the absence of added alcohol. It is also preferred that the intermediate be formed at a temperature from about 20 degrees Celsius to 100 degrees Celsius. Preferably, the process further comprises adding base to the intermediate material to form the inorganic sol. The coating composition may further comprise a thickener and/or one or more additives to control the rheology of the coating composition. Preferably, the thickener is a polyvinyl alcohol. Preferably, the organic colorant is selected from the group suitable for outdoor applications, or "weatherable" organic pigments, and more preferably the organic colorant is selected from the group consisting of phthalocyanine pigments, quinacridone pigments, azo pigments and perylene pigments. Preferably, the organic colorant provides roofing granules having an L* of less than 30. Further, it is preferred that the coating composition be applied to the base particles by a fluidized bed method. Optionally, the coating composition further comprises at least one functional additive selected from the group consisting of biocides, algaecides, fungicides, dyes, fluorescent additives, phosphorescent additives, fragrances, polymeric opacifiers, adhesion promoters, solar heat reflective pigments, and impact modifiers. In addition, the coating composition can further include at least one thermochromic material. In one aspect of the present invention, the at least one functional additive is preferably selected from the group consisting of leachable metal biocides and nonleachable biocides. In this aspect of the invention, the leachable metal biocide is preferably selected from the group consisting of copper based compounds, zinc based compounds and silver based compounds. Further, the at least one nonleachable biocide is preferably selected from the group consisting of photocatalytic oxides and quaternary ammonium functional organosilane compounds Preferably, the process further comprises drying the coating layer at a temperature less than 200 degrees Celsius.

In one embodiment of the present invention, base particles are coated with as single coating composition to form a coating layer on the base particles, and this layer is then cured to form granules having a single cured coating layer including an organic colorant. In another embodiment of the present invention, two or more coating layers are applied, with each layer being cured subsequent to the coating application. Each layer can be formed from a single coating composition containing an organic colorant or mixture of organic colorants, or one or more such layers can include different organic colorants or mixtures of such colorants.

The present process thus provides roofing granules as well as bituminous roofing materials including such roofing granules.

In another aspect, the present invention provides a process for producing roofing granules comprising providing base particles selected from stone dust having a solar reflectance of at least 10 percent and an opacity to ultraviolet radiation of at least 80 percent; providing a sol-gel precursor material selected from tetra $C_2$-$C_5$ alkyloxysilanes and $C_1$-$C_4$-alkyl-tri-$C_2$-$C_5$-alkyloxysilanes; acidifying the sol-gel precursor material to provide an intermediate material; adding base to the intermediate material to form a sol; forming a coating composition including the sol and at least one organic colorant; applying the coating composition to the base particles to form a coating layer on the base particles; curing the coating layer at a temperature less than 200 degrees Celsius to form a gel; and curing the gel to form an impervious coating layer.

The present invention thus provides an inorganic coating system for roofing granules that can be cured at relatively low temperatures and which can employ organic pigments, and improved staining resistance.

DETAILED DESCRIPTION

Figure 1:
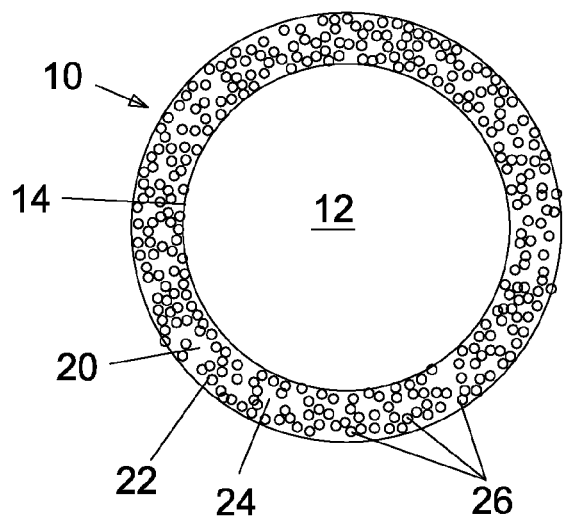
FIG. 1 is a schematic representation of a roofing granule according to a first embodiment of the present invention.

The present invention provides inorganic coating compositions that are curable at relatively low temperatures, such as at less than about 200 degrees Celsius, and which are suitable for roofing granule applications by the use of sol-gel coating methods for forming inorganic coating layers on suitable mineral particles to form roofing granules. Formation of an inorganic material from inorganic precursor materials by sol-gel methods is well-known in the art. Inorganic coating layers formed by sol-gel processes can provide significant advantages over coating layers obtained using conventional process from metal-silicate binders containing kaolin clays as latent heat reactants. Typically, roofing granules coated by the metal-silicate binders are rendered partially insoluble by reacting with kaolin clay at temperatures around 500° C. The resultant surfaces are often porous and highly hydrophilic, which can result in adverse effects regarding staining and adhesion, and roofing granules coated with such material may require surface treatment with a silicone material to mitigate such problems. Furthermore, the use of clay inevitably reduces the color strength of inorganic pigments in earth-tone shades, and often requires a compensatory increase in pigment loading to achieve a desired granule color. In many cases, dark colors or colors with effect pigments can not be achieved due to the presence of the clay. The present invention provides a solution to such problems, since there is no need to use the clay as part of the coating curing composition. As a result, better color strength with equal or less pigment loading can be achieved, even for inorganic pigments. Moreover, the resultant coating surface obtained by a sol-gel process can contain much less porosity, and hence can reduce the staining potential of the roofing granules, as well as eliminating the need for additional surface treatments.

As used in the present specification and claims, "near infrared-reflective" (or "NIR"), and "solar heat-reflective" refer to reflectance in the near infrared range (700 to 2500 nanometers) of the electromagnetic spectrum. "Visible" refers to the visible range of the electromagnetic spectrum (400 to 700 nm). "Ultraviolet" and "UV" refer to the ultraviolet range (10 to 400 nanometers) of the electromagnetic spectrum. "UVA" refers to the portion of the spectrum having wavelengths from 315 to 400 nanometers. "UVB" refers to the portion of the spectrum having wavelengths from 280 to 315 nanometers. As used in the present specification and claims, the "opacity" of an object or medium refers to the extinction of incident radiation by the object or medium and is the sum of the absorption of incident radiation and the scattering of incident radiation. As used in the present specification and claims, "about" means plus or minus five percent or less of the total possible. "Curing" includes heating as well as drying.

As used in the present specification and claims, "solar reflective functional pigment" denotes a pigment selected from the group consisting of light-interference platelet pigments including mica, light-interference platelet pigments including titanium dioxide, mirrorized silica pigments based upon metal-doped silica, metal flake pigments, silica encapsulated metal flake pigments, silicate encapsulated metal flake pigments, metal oxide coated flake pigments, and alumina. As used in the present specification and claims, "granule coloring pigment" denotes a conventional metal oxide-type pigment employed to color roofing granules. As used in the present specification and claims, the strength in color space E* is defined as $E^* = (L^{*2} + a^{*2} + b^{*2})^{1/2}$, where L*, a*, and b* are the color measurements for a given sample using the 1976 CIE L*a*b* color space. The total color difference ΔE* is defined as $\Delta E^* = (\Delta L^{*2} + \Delta a^{*2} + \Delta b^{*2})^{1/2}$ where ΔL*, Δa*, and Δb* are respectively the differences in L*, a* and b* for two different color measurements. "Color strength" means the extent to which a colored pigment maintains its characteristic color when mixed with another pigment.

The process of preparing roofing granules according to the present invention can include first selecting suitable mineral particles for roofing applications, and removing excessive fine particles through either dedusting or sieving processes, to form base particles. Suitable mineral particles include any durable, inert inorganic particles with a particle size between #8 to #50 US mesh, having adequate UV opacity for protecting the asphalt substrate, and good compression strength to endure the coloring and shingle making process. Preferably, the present invention provides highly reflective, solid, durable, and crush-resistant granules suitable for roofing applications with the sizes ranging from −10 to +40 U.S. mesh.

The mineral particles employed in the process of the present invention are preferably chemically inert materials. The mineral particles preferably have an average particle size of from about 0.1 mm to about 2 mm, and more preferably from about 0.4 mm to about 1.5 mm. In some embodiments, the mineral particles employed are agglomerated particles of smaller dimensions. Agglomeration of smaller particles to provide suitable mineral particles is disclosed, for example, in U.S. Patent Publication No. 2004/0258835 A1, incorporated herein by reference.

Stone dust can be employed as the source of the mineral particles in the process of the present invention. Stone dust is a natural aggregate produced as a by-product of quarrying, stone crushing, machining operations, and similar operations. In particular, dust from talc, slag, limestone, granite, marble, syenite, diabase, greystone, quartz, slate, trap rock, basalt, greenstone, andesite, porphyry, rhyolite, greystone, and marine shells can be used, as well as manufactured or recycled manufactured materials such as ceramic grog, proppants, crushed bricks, concrete, such as particles formed from crushed concrete, porcelain, fire clay, and the like. Ceramic materials, such as silicon carbide and aluminum oxide of suitable dimensions can also be used. Preferably, the mineral particles are manufactured from crushing naturally occurring rocks with low free silica into suitable sizes for their UV opacity and protection to asphalt when the roofing granules according to the present invention are employed to protect bituminous roofing materials such as asphalt shingles. Such silica-deficient rocks are generally dark in color and have low solar reflectance in the range around 8 to 15 percent.

The base particle can be a suitably sized mineral particle such as described above, or in the alternative, the base particles can be a solid or hollow glass spheres. Solid and hollow glass spheres are available, for example, from Potters Industries Inc., P.O. Box 840, Valley Forge, Pa. 19482-0840, such as SPHERIGLASS® solid "A" glass spheres product grade 1922 having a mean size of 0.203 mm, product code 602578 having a mean size of 0.59 mm, BALLOTTINI impact beads product grade A with a size range of 600 to 850 micrometers (U.S. sieve size 20-30), and QCEL hollow spheres, product code 300 with a mean particle size of 0.090 mm. Glass spheres can be coated or treated with a suitable coupling agent if desired for better adhesion to the binder of the coating composition.

The sol employed in the process of the present invention can be prepared in any manner known in the art sufficient to provide a gel-forming sol material that can be further processed into an inorganic coating. For example, the sol can be a silica sol prepared by an ion exchange technique such as by passing sodium silicate through a proton-exchanging ion-exchange column, a silica sol prepared by an organic reaction technique, such as by mixing tetraethoxysilane and ethanol followed by the addition of base, by an inorganic reaction technique, such as by mixing solutions of ammonium chloride and sodium silicate followed by removal of the electrolyte and redispersion of the sol, by a Pechini-type process, and the like.

Formation of the inorganic material from the inorganic precursor material by the sol-gel method is well-known in the art. As is understood in the art, a "sol" is a dispersion of colloidal particles dispersed in a liquid; and by "gel" is a network of polymeric chains. Conventionally, the sol-gel method as applied to film formation on a target surface is understood to include the steps of forming a sol of colloidal particles of inorganic precursor material dispersed in a liquid carrier; applying the sol of colloidal particles to surface to be covered (i.e. film deposition); gelling the mixture on the surface so as to form a three-dimensional network of colloidal particles and a network of pores (i.e. a xerogel), and eliminating the liquid phase to obtain a thickening or the chemical stabilization of the network of pores and formation of a film on the surface to be covered. The physics and chemistry of the sol-gel method are reviewed in C. Jeffrey Binker et al., *Sol-Gel Science* (Academic Press Boston 1990). The sol of inorganic precursor material can also include a sacrificial template material, which is removed after film formation to provide a pore network. In the absence of a template material, control of the size and extent of aggregation of the colloidal particles of inorganic precursor material during film deposition, and control of the relative rates of condensation and evaporation of the liquid carrier, determines the characteristics of the pore network so formed, including the pore volume of the coating layer, the pore size, and the surface area of pores. Conversely, when a template material is included in the sol of inorganic precursor material, the nature and amount of the template material affects the characteristics of the pore network obtained. In the present process, the conditions of gel formation and drying are preferably selected so as to minimize the size of the pores formed.

The sol employed in the process of the present invention is preferably an aqueous colloidal suspension prepared from one or more organic precursors selected from alkylsilanes, and alkoxysilanes, including tetralkoxysilanes such as tetramethoxysilane (TMOS), tetraethoxysilane (TEOS), tetra-n-propoxysilane, tetra-n-butoxysilane, and tetrakis(2-methoxyethoxy)silane; organotrialkoxysilanes such as methyltriethoxysilane (MTEOS), methyltrimethoxysilane, methyl tri-n-propoxysilane, phenyl triethoxysilane, and vinyl triethoxysilane, siloxane oligomers such as hexamethoxydisiloxane, and octamethoxytrisiloxane; aluminum alkoxides such as aluminum tributoxide, titanium alkoxides such as titanium tetraethoxide and titanium tetraisopropoxide, zirconium alkoxides such as zirconium tetraethoxide, aluminum chloride, zirconyl chloride, organozirconates, organotitanates, and the like.

Examples of suitable liquid media include water, alcohols such as ethanol, and other polar solvents.

Sols useful for preparing the roofing granules of the present invention can be formed by conventional sol-gel processes. For example, a suitable sol can be prepared by mixing or dissolving a suitable organic precursor such as TEOS with an aqueous solvent, such as a dilute solution of hydrochloric acid, and maintaining the reactant solution, preferably at a temperature from about 20 degrees Celsius and 100 degrees Celsius, for a sufficient time, such as from about 30 minutes to one hour, to obtain the conversion of the inorganic precursor into the corresponding hydroxide species, such as aqueous silicate species, and initiate polymerization or condensation of such species. Subsequently, the pH of the reactant solution can be raised by addition of an aqueous base such as ammonium hydroxide to stabilize the growing colloidal particles. The TEOS hydrolyzes in the dilute acid to form partially hydrolyzed species as well as silicic acid itself. The hydrolyzed species subsequently aggregate and polymerize to form the desired sol. Preferably, the ionic strength of the aqueous medium is sufficient to stabilize the sol so as to avoid premature gelation. Preferably, sol particles so produced have an average particle size from about 50 nm to 500 nm, preferably, from about 50 nm to 300 nm, and more preferably from about 50 nm to 200 nm.

If desired, the rheology of the aqueous sol particle dispersion can be adjusted by addition of a small quantity, preferably from about 5 to 20 percent based on weight of the metal oxide, of suitable thickening agents, such as polyvinyl alcohol, polyethylene oxide, or the like, and/or by the addition of other rheology control agents known in the coatings arts.

Pigment particles are added to and dispersed in the aqueous sol particle dispersion to form an aqueous coating composition. Preferably, the pigment particles comprise one or more organic pigments. Organic pigments and their properties are described in the *Kirk-Othmer Encyclopedia of Chemical Technology*, Fifth Edition, Volume 19, pages 417-456, which disclosure is incorporated herein by reference. One or more dispersants for the pigment particles can also be included in the aqueous coating composition to disperse and stabilize the pigment particles. Dispersants can be selected depending upon the properties of the pigment particles to be dispersed. Such properties include chemical composition, electrochemical properties, and extent of aggregation of the pigment particles. Dispersants for inorganic pigments are disclosed, for example, in U.S. Pat. Nos. 4,053,325, 4,753,679, 4,952,617, 5,059,250, and 5,401,313. Dispersants for organic pigment particles are disclosed, for example, in U.S. Pat. Nos. 6,268,410, 6,852,817, and 6,786,965. Examples of organic pigment dispersants include alkylbenzene sulfonic acid salts, naphthalenesulfonic acid salts, alkylphenolpolyethoxylated surfactants, diethylene glycol monomethyl ether acetate, and polymeric dispersants such as homopolymers and copolymers, including random and block copolymers, of acrylic and methacrylic acid.

The pigment particles may comprise a pigment preparation, that is, a combination of a base pigment and a pigment dispersant. Pigment dispersants comprise pigments substituted with functional groups having a specific desired activity, such as by chemically modifying a pigment to add functional groups such as sulfo acid, sulfonamide, sulfo acid ester, ether, thioether, carboxylic acid, carboxylic ester or carboxamide functional groups. Examples of pigment preparations including pigment dispersants are provided, for example, in U.S. Pat. No. 7,387,670. In addition, or in the alternative, the pigment particles themselves can be coated with a suitable dispersant material.

Suitable pigments can be identified by reference to their respective C.I. (Color Index) name, color index number, and/or chemical description. Pigment particles useful in the present invention include conventionally sized pigment particles having an average particle size greater than about 500 nanometers, typically from about 0.01 to 100 microns, usually 0.01 to 50 microns; including meso-sized pigment particles having an average particle size from about 150 to 500 nanometers, and nano-sized pigment particles having an average particle size less than about 150 nanometers.

In another aspect of the present invention, pigment particles are themselves coated with an inorganic material such as titanium dioxide using a sol-gel process, such as disclosed in J. Yuan et al., *J. Phys. Chem. B*, (2006) (1), pp. 388-394, or nano-silica such as disclosed in J. Yuan et al., *Dyes and Pigments*, 76 (2008) pp. 463-469, in order to improve the performance properties of the pigment particles such as UV resistance and thermal stability.

Preferably, the physical properties of the organic pigment employed in the process of the present invention are selected to provide good color intensity, exterior durability, thermal stability, light-fastness, dispersability, and alkaline resistance. Organic pigment properties include particle size, particle size distribution, crystal form, surface treatment and the like. In order to avoid common coating application problems such as blooming, bleeding and recrystallization, the organic pigment selected is preferably insoluble in aqueous media including acidic aqueous media such as encountered by exterior roofing granules during long-term exterior exposure to the elements.

In one aspect, the current invention enables the use of organic colorants such as organic pigments for coloring roofing granules. The organic colorants are known for their high chromaticity and color saturation, which can provide a color space for roofing granules that is otherwise unattainable with inorganic pigments in combination with metalsilicate binders. Examples of many organic pigments suitable for exterior applications can be found in the National Printing Ink Research Institute ("NPIRI")'s *Raw Materials Data Handbook*, Volume 4, Pigments (2000 National Association of Printing Ink Manufacturers), incorporated herein by reference. Further, UV absorber and/or UV inhibitor materials can also be used in the process of the present invention, for example, by including such material in the aqueous coating composition with the organic pigment, to increase the service life of the organic pigment in an outdoor environment. Examples of such UV absorbers include nano-$TiO_2$, nano-ZnO, nano iron oxides, hindered amine UV inhibitors, and free radical scavengers.

Suitable organic pigments for use in the present invention can be selected from the quinacridone pigments; phthalocyanine pigments; azo pigments such as mono azo pigments, and including azo lakes, azo chelates, and condensed azo pigments; beta-naphthol pigments; anthraquinone pigments including anthrapyrimidine pigments, flavanthrone pigments, pyranthrone pigments, and anthanthrone pigments, dioxazine pigments; quinophathalone pigments, diketopyrrolopyrrole pigments, thioindigo pigments, perylene pigments, perinone pigments, indanthrone pigments, isoindoline pigments, isoindolinone pigments, quinophathalone pigments, quinacridone pigments, quinacridone quinone pigments, and thiazineindigo pigments. In particular, preferred phthalocyanine pigments include phthalocyanine green and phthalocyanine blue. Preferred quinacridone pigments include beta-quinacridone, gamma-quinacridone, 2,9-dimethyl quinacridone, 2,9-dichloroquinacridone, and 1,8-dichloroquinacridone.

In order to improve hiding, the aqueous coating composition can also include a suitable inorganic pigment having good reflectance, such as titanium dioxide.

A colored, infrared-reflective pigment can also be employed in preparing the aqueous coating composition used to prepare the roofing granules of the present invention. Preferably, the colored, infrared-reflective pigment comprises a solid solution including iron oxide, such as disclosed in U.S. Pat. No. 6,174,360, incorporated herein by reference. The colored infrared-reflective pigment can also comprise a near infrared-reflecting composite pigment such as disclosed in U.S. Pat. No. 6,521,038, incorporated herein by reference. Composite pigments are composed of a near-infrared non-absorbing colorant of a chromatic or black color and a white pigment coated with the near-infrared non-absorbing colorant. Near-infrared non-absorbing colorants that can be used in the present invention are organic pigments such as organic pigments including azo, anthraquinone, phthalocyanine, perinone/perylene, indigo/thioindigo, dioxazine, quinacridone, isoindolinone, isoindoline, diketopyrrolopyrrole, azomethine, and azomethine-azo functional groups. Preferred black organic pigments include organic pigments having azo, azomethine, and perylene functional groups.

The roofing granules of the present invention can also include conventional inorganic pigments, such as metal oxide coatings pigments, which can be included in the aqueous coating composition in addition to or instead of organic pigment particles. In the alternative, metal oxide coating pigments can be used to color an initial coating layer formed on the mineral particles by a conventional high temperature process using a silicate-based coating material, followed by application of sol-gel outer layer coating, the sol-gel outer layer including at least one organic pigment.

Examples of inorganic pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black. Inorganic pigments include titanium dioxide pigments, zinc oxide pigments, zinc sulfide pigments, iron oxide pigments, chromium oxide pigments, mixed metal oxide pigments, cadmium sulfide pigments, cadmium yellow pigments, cadmium sulfoselenide pigments, cadmium mercury sulfide pigments, bismuth pigments, chrome yellow pigments, molybdate red pigments, molybdate orange pigments, chrome orange pigments, chrome green pigments, ultramarine pigments, iron blue pigments, and carbon black pigments. Example of transparent inorganic pigments that can be used include transparent iron oxide pigments, transparent iron blue pigments, transparent cobalt blue pigments, transparent cobalt green pigments, transparent titanium dioxide pigments, and transparent zinc oxide pigments.

The roofing granules of the present invention can also include light-interference platelet pigments. Light-interference platelet pigments are known to give rise to various optical effects when incorporated in coatings, including opalescence or "pearlescence."

Examples of light-interference platelet pigments that can be employed in the process of the present invention include pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), and TZ4002/600 (mica and iron oxide, bronze appearance).

Examples of light-interference platelet pigments that can be employed in the process of the present invention also include pigments available from Merck KGaA, Darmstadt, Germany, such as Iriodin® pearlescent pigment based on mica covered with a thin layer of titanium dioxide and/or iron oxide; Xirallic™ high chroma crystal effect pigment based upon $Al_2O_3$ platelets coated with metal oxides, including Xirallic T 60-10 WNT crystal silver, Xirallic T 60-20 WNT sunbeam gold, and Xirallic F 60-50 WNT fireside copper; ColorStream™ multi color effect pigments based on $SiO_2$ platelets coated with metal oxides, including ColorStream F 20-00 WNT autumn mystery and ColorStream F 20-07 WNT viola fantasy; and ultra interference pigments based on titanium dioxide and mica.

Light interference pigments are disclosed, for example, in U.S. Pat. No. 7,235,300. Suitable light-interference pigments suitable for use in the present invention include those metal-coated magnesium fluoride pigments marketed by JDS Uniphase Corporation as ChromaFlair® Red/Gold 000, Silver/Green 060, Gold/Silver 080, Green/Purple 190, Cyan/Purple 230, Blue/Red 280 and Magenta/Gold 334.

The aqueous coating composition can also include opacifiers or opacifying organic pigments, such as disclosed, for example, in U.S. Pat. Nos. 4,594,363, 5,036,109, 5,053,441, 5,135,568, 5,147,940, 5,273,824, 5,521,253, 6,043,319 and 6,720,007, and available commercially as hollow sphere polymeric styrene-acrylic particles from Rohm and Haas Company (Philadelphia, Pa.) as Ropaque® Ultra opacifier and from Dow Chemical Company (Midland, Mich.) under the "DPP" grade designation. Preferably, the average particle size of such opacifiers is from about 0.1 micrometers to about 10 micrometers, and more preferably from about 0.2 micrometers to about 0.8 micrometers. Such opacifiers can have an average particle size of about 0.4 micrometers, with a shell thickness of about 0.09 micrometers and contain a void volume of about 55 percent.

The aqueous coating composition can include organic or inorganic additives, such as biocides, algaecides, fungicides, dyes, fluorescent additives, phosphorescent additives, fragrances, polymeric opacifiers, adhesion promoters, and impact modifiers. Incorporation of biocides, algaecides, and fungicides in coatings formed by sol-gel processes over coating formed using conventional metal-silicate binders containing inorganic algaecides advantageously provide wider ranges of biocides for bio-film control optimization, better encapsulation, and more accurate control of biocide release. Examples of biocides which can be included in the aqueous coating compositions of the present invention include, but are not limited to, leachable inorganic biocides, leachable organic biocides, non-leachable organic biocides, and non-leachable inorganic biocides.

The aqueous coating composition can be applied to the mineral particles by coating techniques such as pan coater, spraying, dip coating, fluidized bed coater, curtain coater, or any coating encapsulation methods. Other coating methods suitable for this purpose will become apparent to those who are skilled in the art. After the aqueous coating composition has been applied to the mineral particles to form a coating layer, the coating layer can be dried or cured at room temperature or heat treated at temperatures below 200 degrees Celsius to accelerate the cure of the coating composition to complete formation of a gel and remove residual solvent from the coating layer. This can be achieved, for example, by passing the coated mineral particles through a rotary dryer or through a fluidized bed.

In one aspect of the process of the present invention, base particles are coated with as single coating composition to form a coating layer on the base particles, and this layer is cured to form granules having a single cured coating layer. In another aspect of the process of the present invention, two or more coating layers are applied, with each layer being cured subsequent to the coating application. In this aspect, a single coating composition can be used. In the alternative, two or more different coating compositions can be used to form two or more coating layers on the base particles. For example, two different coating compositions can be employed, each including a different organic colorant, or different combinations of organic colorants.

Additional surface treatments for added surface functionalities or dust-controlling agents can be post-added for desirable applications once the coating process is complete.

In one aspect of the process of the present invention, mineral particles are initially coated with a first coating composition to form a first or inner layer including a solar heat-reflective material, such as a solar heat-reflective pigment, to form intermediate particles. Solar heat-reflective roofing granules, such as those disclosed in U.S. Pat. No. 7,241,500, incorporated herein by reference, can be used as such intermediate particles. The intermediate particles are subsequently coated with an aqueous gel coating composition including organic pigment to form a second or outer coating layer on the intermediate particles. Since many organic pigments tend to be relatively transparent to near infrared (NIR) radiation of the solar spectrum, which contains more than 50% of the total solar heat energy, the underlying solar heat reflective pigment can significantly increase the solar heat reflectance of roofing granules prepared according to the present invention. Examples of solar heat-reflective pigments are provided in the Lawrence Berkeley National Laboratory Pigment Database, published on-line by the Heat Island Group, Lawrence Berkeley National Laboratory, Berkeley, Calif., incorporated herein by reference. Thus, by coloring the roofing granules with such pigments over a reflective substrate, colored roofing granules which reflect a substantial proportion of solar near infrared radiation can be prepared according to the present invention.

In another aspect of the present invention, the coating composition employed includes "smart" or responsive materials to optimize the solar heat absorption/reflection in order to optimize the building energy usage. Examples of such materials include, but are not limited to, thermochromic materials that will change from absorbing to reflecting near infrared radiation as the ambient temperature rises, such that the roofing materials surfaced by the granules including such thermochromic material will optimize the solar heat flux into buildings roofed with such roofing materials, and thus enhance the overall energy efficiency of the building. Examples of thermochromic materials that can be used in the process of the present invention are disclosed in U.S. Patent Publication 2008/0008857A1, incorporated herein by reference.

Referring now to the figures in which like reference numerals represent like element in each of the several views, there is shown in FIG. 1, a schematic illustration of the structure of a colored solar reflective roofing granule 10 according to a presently preferred first embodiment of the present invention. The colored roofing granule 10 includes a base particle 12 comprising stone dust and having an exterior surface 14 coated with a layer 20 of cured coating composition 22 comprising a coating binder 24 and multiple particles of at least one organic pigment 26, such as a quinacridone pigment and/or a phthalocyanine pigment. The cured coating composition 22 is prepared by a sol-gel process according to the present invention, wherein the coating binder 24 is prepared by drying and curing an aqueous coating composition comprising a sol of colloidal silica particles formed by hydrolysis of tetraethoxysilane and condensation of the hydroxide species. The aqueous coating composition can also include a thickening agent such as polyvinyl alcohol to provide a rheology suitable for the application method selected. The aqueous coating composition can be applied to the stone dust base particles 12 using a fluidized bed coater. Preferably, in the colored roofing granules 10, the at least one organic pigment 26 comprises from about 1 percent by weight to about 60 percent by weight of the coating composition. Preferably, the cured coating composition 22 comprises from about 2 percent by weight of the base particles 12 to about 20 percent by weight of the base particles 12. More preferably, the cured coating composition 22 comprises from about 4 percent by weight of the base particles 12 to about 10 percent by weight of the base particles 12.

Figure 2:
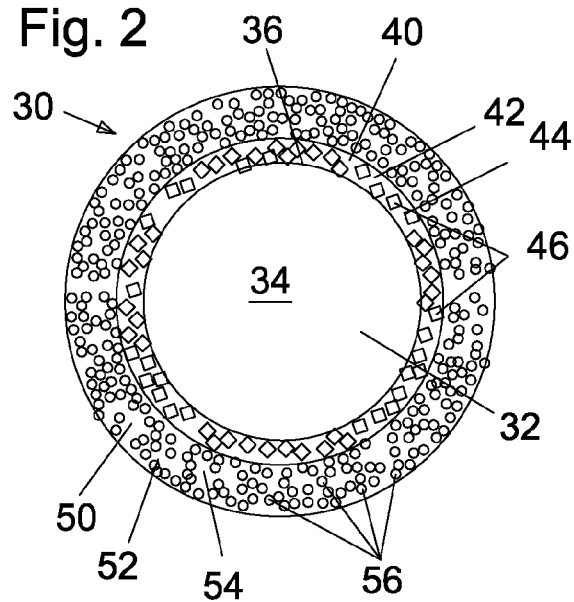
FIG. 2 is a schematic representation of a roofing granule according to a second embodiment of the present invention.

FIG. 2 is a schematic illustration of the structure of a colored roofing granule 30 according to a presently preferred second embodiment of the present invention. In this embodiment, roofing granule 30 includes a base particle 32 comprising a mineral particle 34 formed from stone dust having an exterior surface 36 coated with cured base coating composition 42 including a base coating binder 44, and at least one solar reflective pigment 46, and optionally, at least one conventional metal oxide inorganic pigment, to form an initial or first coating layer 40. The base coating binder can be formed by a sol-gel process according to the present invention from a sol of colloidal silica. In this case, the base coating composition can also include at least one organic pigment (not shown). In the alternative, the base coating binder can be a conventional metal oxide silicate binder formed from an alkali metal silicate such a sodium silicate and a clay, such as kaolin clay, cured at an elevated temperature in excess of 200 degrees Celsius. The at least one solar reflective pigment 46 is preferably a titanium dioxide pigment. It is preferred that the at least one solar reflective pigment 46 comprises from about 5 percent by weight to about 60 percent by weight of the base coating composition, and more preferred that the at least one solar reflective pigment 46 comprises from about 30 percent by weight to about 40 percent by weight of the base coating composition. In this embodiment, the base coating composition preferably comprises from about 1 percent by weight of the inert mineral particles 34 to about 20 percent by weight of the inert mineral particles 34, and more preferably, from about 4 percent by weight of the base particles to about 10 percent by weight of the inert mineral particles 34. The colored solar reflective roofing granules 30 of this second embodiment include an exterior coating layer 50 comprising a second, cured coating composition 52, comprising a coating binder 54, and at least one organic pigment 56. In this embodiment, the binder of the second coating composition 54 comprises an aqueous colloidal silicate sol, which thus can in some instances be the same as the base coating binder employed to form the first coating composition. The cured second coating composition 52 forms a second or outer layer 50 having a composition which differs from the composition forming the initial coating layer 40 on the mineral particle 34.

In this second embodiment of colored roofing granules 30 of the present invention, the color of the colored roofing granules 30 is largely attributable to the at least one organic pigment 56 in the outer coating layer 50 and the solar reflectance is largely attributable to the solar reflective pigment 46 in the inner or first layer 40 of the cured base coating composition 42, assuming that the optional inorganic or organic pigment is not included in the inner coating layer 40.

Figure 3:
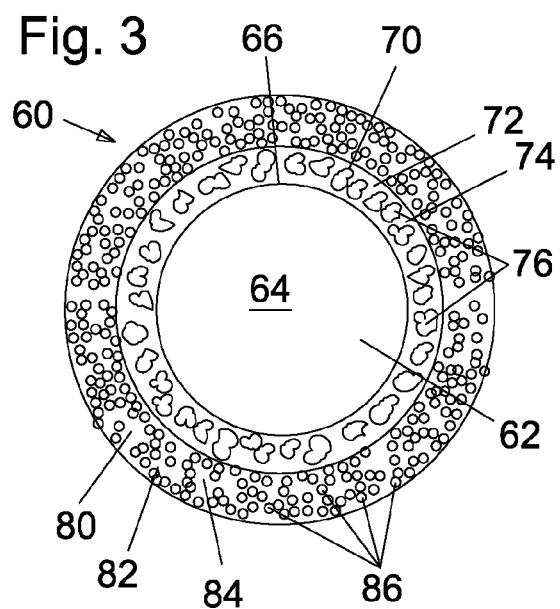
FIG. 3 is a schematic representation of a roofing granule according to a third embodiment of the present invention.

FIG. 3 is a schematic illustration of the structure of a colored roofing granule 60 according to a presently preferred third embodiment of the present invention. In this embodiment, roofing granule 60 includes a base particle 62 comprising a mineral particle 64 formed from stone dust having an exterior surface 66 coated with cured base coating composition 70 including a base coating binder 74, and at least one first organic pigment 76, and optionally, at least one conventional metal oxide inorganic pigment, to form an initial or first coating layer 72. The base coating binder is formed by a sol-gel process according to the present invention from a sol of colloidal silica. The at least one first organic pigment 76 can be a quinacridone or phthalocyanine pigment. It is preferred that the at least one first organic pigment 76 comprises from about 5 percent by weight to about 60 percent by weight of the base coating composition, and more preferred that the at least one first organic pigment 76 comprises from about 30 percent by weight to about 40 percent by weight of the base coating composition. In this embodiment, the base coating composition preferably comprises from about 1 percent by weight of the inert mineral particles 64 to about 20 percent by weight of the inert mineral particles 64, and more preferably, from about 4 percent by weight of the base particles to about 10 percent by weight of the inert mineral particles 64. The colored roofing granules 60 of this second embodiment include an exterior coating layer 80 comprising a second, cured coating composition 82, comprising a coating binder 84, and at least one second organic pigment 86, which can be chosen from the class of transparent organic pigments. In this embodiment, the binder of the second coating composition 82 comprises an aqueous colloidal silicate sol, which thus can be the same as the base coating binder employed to form the first coating composition. The cured second coating composition 82 forms a second or outer layer 80 having a composition which differs from the composition forming the initial coating layer 72 on the mineral particle 64.

In this third embodiment of colored roofing granules 60 of the present invention, the color of the colored roofing granules 60 is attributable to both the at least one first organic pigment 76 in the inner coating layer 70 and the at least one second organic pigment 86 in the outer layer 80.

The roofing granules of the present invention can be employed in the manufacture of roofing products, such as asphalt shingles and bituminous membranes, using conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The solar reflective roofing granules of the present invention can be mixed with conventional roofing granules, and the granule mixture can be embedded in the surface of such bituminous roofing products using conventional methods. Alternatively, the solar reflective roofing granules of the present invention can be substituted for conventional roofing granules in manufacture of bituminous roofing products.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. Roofing granules are then distributed over selected portions of the top of the sheet, and the bituminous material serves as an adhesive to bind the roofing granules to the sheet when the bituminous material has cooled. The reverse side of the substrate sheet can then be coated with an anti-stick material such as a suitable mineral powder or a fine sand. The sheet can then be cut into conventional shingle sizes and shapes (such as one foot by three feet rectangles), slots can be cut in the shingles to provide a plurality of "tabs" for ease of installation and aesthetic effect, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products. Alternatively, the sheet can be formed into membranes or roll goods for commercial or industrial roofing applications.

The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

Example 1

Figure 4:
FIG. 4 is a photograph of a conventional white coated mineral particle.

Mineral particles with size between #12 and #40 mesh (#93 white granules available from CertainTeed Corp., Norwood, Mass., an example of which is shown in the photograph of FIG. 4) were coated with a silica coating derived from sol-gel process and containing organic pigments. The sol-gel coating is prepared in the following manner: a solution of tetraethoxysilane (30 ml, TEOS 99%, Aldrich) in aqueous 0.1 M hydrochloric acid (210 ml) is prepared at 60 degrees C. for 1 hour, then 21 ml of ammonium hydroxide (1M) is added to yield colloidal silica. After one hour of stirring to promote maturation of the colloidal silica, 90 ml of an aqueous dispersion of polyvinyl alcohol (20,000 g/mole, Aldrich, 15 wt %) is added in the solution. At the end of the addition, 2.8 g of organic black pigment (Palmogen L0086, BASF Corp. Florham Park, N.J.), 7.5 g of ultramarine blue pigment (FP4O, Ferro Corp., Columbus, Ohio), and 0.18 g of organic red pigment (Paliogen Rot L3S8OHD, BASF Corp., Florham Park, N.J.) are added under vigorous stirring. Table 1 summarizes the composition and amount used in the experiment.

Figure 5:
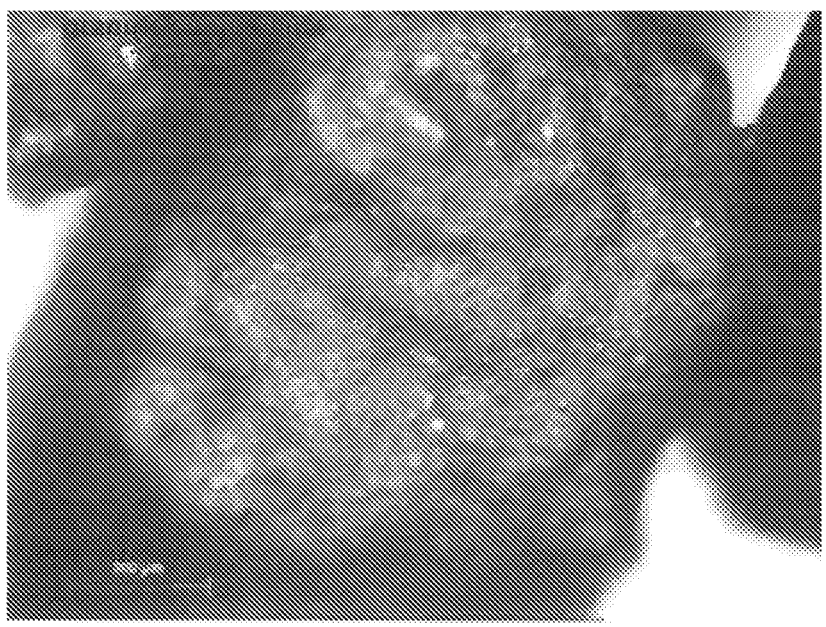
FIG. 5 is a photograph of a roofing granule according to the present invention.

After the coating preparation, 950 g of the mineral particles are coated with 300 ml of the coating in a fluidized bed coater (ProCepT 4M8, ProCepT N.V., Zelzate, Belgium) using air flux of 1.5 m³/min. and chamber temperature of 60° C. The coating spray rate was 3 ml/min. The resultant granules, an example of which is shown in the photograph of FIG. 5, have a very desirable dark blue color and a portion of the granules are heat treated at temperatures between 130° C. and 200° C. for comparison. The coating derived from the sol-gel process produces a very uniform thin coating over the highly irregular surface of the mineral particles.

The granules are measured for their solar reflectance according to ASTM C1459 and the color values using colorimeter (Labscan XE from Hunter Association Laboratory, Reston, Va.) using D65 illumination and 10° observer. They were also measured for their pigment loss according to ARMA Granule Test Manual Method #6 and their staining resistance according to the Method #10. The results are shown in Table 2. As can be seen, the granules coated by sol-gel coating have very desirable color with high solar reflectance and enhanced staining resistance as compared to a control sample, which has a staining index of 1.64.

TABLE 1

| Ingredients | Amount |
| --- | --- |
| TEOS | 35 ml |
| HCl 0.01M | 210 ml |
| NH₄OH 1M | 21 ml |
| PVA 15% wt | 90 ml |
| Perylene Black Pigment | 2.8 g |
| Ultramarine Blue Pigment | 7.5 g |
| Perylene Red pigment | 0.18 g |

TABLE 2

| Heat Treatment | L* | a* | b* | Solar Reflectance | Pigment Loss, gm | Staining Index |
| --- | --- | --- | --- | --- | --- | --- |
| No | 27.73 | −0.3 | −9.56 | 23.2% | 0.6448 | — |
| Yes | 26.72 | −2.57 | −8.52 | 23.5% | 0.621 | 0.58 |

Example 2

Figure 6:
FIG. 6 is a photograph of a group of uncoated mineral particles.

Mineral particles with size between #12 and #40 mesh (#11 grade rhyolite mineral particles available from CertainTeed Corp., Norwood, Mass., FIG. 6) were coated with a silica coating derived from sol-gel process and containing organic pigments. The sol-gel coating is prepared in the following manner: A solution of tetraethoxysilane (30 ml, TEOS 99%, Sigma-Aldrich, Milwaukee, Wis.) in aqueous 0.1 M hydrochloric acid (210 ml) is prepared at 60 degrees C. for 1 hour, then 21 ml of ammonium hydroxide (1M) is added to yield colloidal silica. After one hour of stirring to promote maturation of the colloidal silica, 90 ml of an aqueous dispersion of polyvinyl alcohol (20,000 g/mole, Sigma-Aldrich, 15 wt percent) is added in the solution. At the end of the addition, 5.75 g of white pigment Ti-Pure R-101 (DuPont de Nemours, Wilmington, Del.) and 2 g of organic pigment Ropaque (Rohm & Haas) are added under vigorous stirring. Table 3 summarizes the composition and amount used in the experiment.

Figure 7:
FIG. 7 is a photograph of a group of roofing granules according to the present invention.

After the coating preparation, 950 g of the mineral particles are coated with 300 ml of the coating in a fluidized bed coater (ProCepT 4M8) using air flux of 1.5 m³/min. and chamber temperature of 60° C. The coating spray rate was 3 ml/min. The resultant granules, an example of which is shown in the photograph of FIG. 7, have a homogeneous and off-white white color and the granules are heat treated at temperatures of 150° C. for 30 min. The coating derived from the sol-gel process produces a very uniform thin coating over the highly irregular surface of the mineral particles, see FIG. 7.

The granules are measured for their solar reflectance according to ASTM C1459 and the color values using colorimeter (Labscan XE from Hunter Association Laboratory, Reston, Va.) using D65 illumination and 10° observer. They were also measured for their pigment loss according to ARMA Granule Test Manual Method #6 and their staining resistance according to the Method #10. The results are shown in Table 4. As can be seen, the granules coated by sol-gel coating has very desirable color with high solar reflectance and enhanced staining resistance of DE*=0.37 as compared to a control sample of regular white roofing granules (#93 white granules, available from CertainTeed Corp., Norwood, Mass.), which have a staining index of 3.37.

TABLE 3

| Ingredients | Amount |
|---|---|
| TEOS | 35 ml |
| HCl 0.01M | 210 ml |
| NH$_4$OH 1M | 21 ml |
| PVA15% wt | 90 ml |
| Ti-Pure pigment | 5.75 g |
| Ropaque opacifier | 2 g |

TABLE 4

| Heat Treatment | L* | a* | b* | Solar Reflectance | Pigment Loss, gm | Staining Index DE* |
|---|---|---|---|---|---|---|
| Yes | 67.74 | −1.56 | −1.11 | 30.1% | 0.5393 | 0.37 |

Various modifications can be made in the details of the various embodiments of the processes, compositions and articles of the present invention, all within the scope and spirit of the invention and defined by the appended claims.

The invention claimed is:

1. A process for producing roofing granules, the process comprising:
    (a) providing base particles;
    (b) providing a coating composition comprising an inorganic sol material and at least one organic colorant, wherein the coating composition further includes at least one thermochronic material;
    (c) applying the coating composition to the base particles to form a coating layer on the base particles, and
    (d) curing the coating layer at a temperature less than 200 degrees Celsius.

2. A process according to claim 1 wherein the inorganic sol is selected from sols of alkylsilanes, alkoxysilanes, siloxane oligomers; aluminum alkoxides, titanium alkoxides, zirconium alkoxides, aluminum chloride, zirconyl chloride, organozirconates, and organotitanates.

3. A process according to claim 1 further comprising preparing the inorganic sol from a hydrolyzable sol-gel precursor material by acidifying the precursor material to initiate hydrolysis and condensation of the precursor material to form an intermediate material.

4. A process according to claim 3 wherein the sol-gel precursor material is an alkoxysilane selected from the group consisting of tetramethoxysilane, tetraethoxysilane, tetra-n-propoxysilane, tetra-n-butoxysilane, tetrakis(2-methoxyethoxy)silane, methyltriethoxysilane, methyltrimethoxysilane, methyl tri-n-propoxysilane, phenyl triethoxysilane, and vinyl triethoxysilane.

5. A process according to claim 3 wherein the intermediate material is formed in the absence of added alcohol.

6. A process according to claim 3 wherein the intermediate is formed at a temperature from about 20 degrees Celsius to 100 degrees Celsius.

7. A process according to claim 3 further comprising adding base to the intermediate material to form the inorganic sol.

8. A process according to claim 1 wherein the coating composition further comprises a thickener.

9. A process according to claim 8 wherein the thickener is a polyvinyl alcohol.

10. A process according to claim 1 wherein the organic colorant is selected from the group consisting of weatherable organic pigments.

11. A process according to claim 1 wherein the organic colorant is selected from the group consisting of phthalocyanine pigments, quinacridone pigments, azo pigments and perylene pigments.

12. A process according to claim 1 wherein the coating composition is applied to the base particles by a fluidized bed method.

13. A process according to claim 1 further comprising drying the coating layer at a temperature less than 200 degrees Celsius.

14. A process according to claim 1 wherein the organic colorant provides roofing granules having an L* of less than 30.

15. A process according to claim 1 wherein the coating composition further comprises at least one functional additive selected from the group consisting of biocides, algaecides, fungicides, dyes, fluorescent additives, phosphorescent additives, fragrances, polymeric opacifiers, adhesion promoters, and impact modifiers.

16. A process according to claim 15 wherein the at least one functional additive is selected from the group consisting of leachable metal biocides and nonleachable biocides.

17. A process according to claim 16 wherein the leachable metal biocide is selected from the group consisting of copper based compounds, zinc based compounds and silver based compounds.

18. A process according to claim 16 wherein the nonleachable biocide is selected from the group consisting of photocatalytic oxides and quaternary ammonium functional organosilane compounds.

* * * * *